Patented Dec. 18, 1951

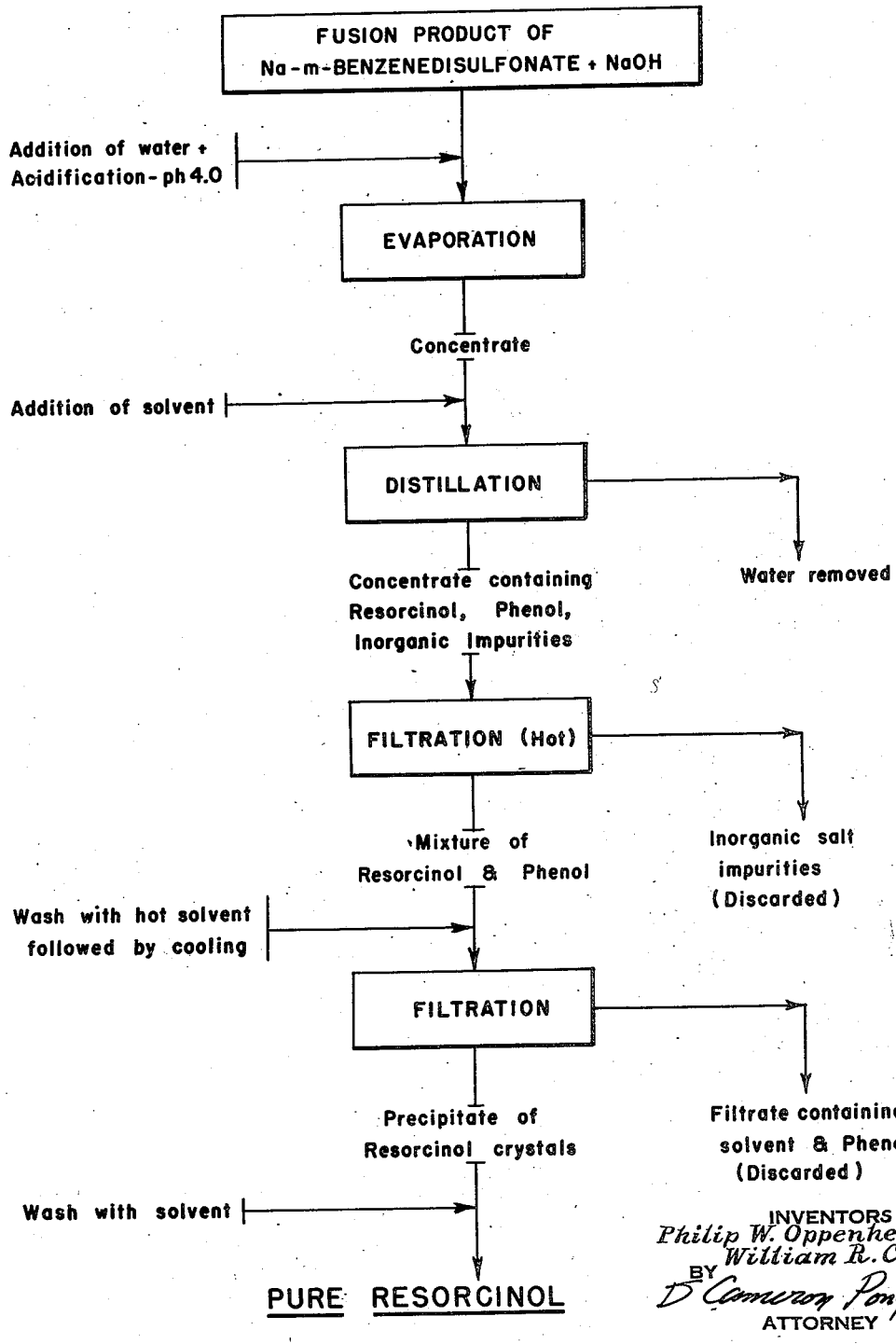

2,579,122

UNITED STATES PATENT OFFICE 2,579,122

RESORCINOL RECOVERY PROCESS

Philip W. Oppenheimer, Yonkers, N. Y., and William R. Cake, Rutherford, N. J., assignors to Heyden Chemical Corporation, New York, N. Y., a corporation of Delaware Application April 13, 1949, Serial No. 87,344

5 Claims. (Cl. 260—621)

Our invention relates particularly to a process whereby resorcinol can be recovered, even in the pure form, from reaction liquors.

An object of our invention is the isolation of resorcinol, which can be obtained even in the pure form if desired, from reaction liquors containing resorcinol and which may also contain phenol and inorganic salts. Such a reaction liquor is set forth, for example, in the patent to McCormack, No. 1,406,745, granted February 14, 1922.

In carrying out our invention, for instance, a reaction mixture, containing resorcinol, phenol and one or more inorganic salts, from which the resorcinol is to be recovered, is mixed with a solvent that dissolves substantially all of the resorcinol and phenol, but substantially none of the salts, present at relatively high temperatures, after which the resultant slurry can be filtered hot. The filtrate, when cooled, precipitates the pure resorcinol in substantially quantitative yields.

Further objects will appear from the detailed description thereof hereinafter.

While our invention is capable of being carried out in many different ways, for the purpose of illustration we have described only certain embodiments thereof hereinafter, in the following examples.

In accordance with our invention virtually all of the inorganic salts can be separated from the resorcinol reaction mixture in a single step, instead of the several steps previously found to be necessary. We have discovered that the resorcinol can be effectively separated from the phenol present in the reaction mixture, as even at low temperatures phenol is extremely soluble in the solvent medium which we utilize. In this way a substantially phenol-free resorcinol can be obtained without a distillation step being necessary.

For example, we may proceed as follows, as illustrated by the attached flow sheet, the parts mentioned being by weight:

Example 1

The mixture obtained from the fusion of sodium-m-benzenedisulfonate with sodium hydroxide is dissolved in water and adjusted to pH 4 with sulfuric acid of any desired strength. After the bulk of the water has been evaporated off under any desired amount of vacuum, chlorobenzene in the ratio of fifteen parts solvent to one part of resorcinol is added, and the last traces of water are removed by distillation. A pseudoball mill, which consists of a flask which is fitted with a good agitator and which contains 6 to 8 marbles, may be used to break up lumps of solids during the extraction procedure. Before its temperature has fallen much below the boiling point of chlorobenzene, for instance while the temperature is still preferably above 110° C., the mixture is filtered rapidly on a hot Büchner funnel. The residue is washed with hot chlorobenzene. Then the chlorobenzene extract is cooled to room temperature. The resorcinol crystals which precipitate from the solution are filtered, washed with low boiling petroleum ether and dried to constant weight. The product assays 97.1% resorcinol by the $CH_2O$-resorcinol condensation method and is made up of light tan needle-like crystals which melt at 107–111° C. The melting point of the pure compound is given in the literature as 109–111° C.

Example 2

The process described above, in Example 1, is repeated using toluene in place of the chlorobenzene. The crystalline material obtained assays as containing 98% resorcinol.

Because the solubility of resorcinol in toluene drops sharply just below the boiling point of the solvent, it is desirable to carry out the filtration at a temperature close to 110° C. in order to prevent the loss of an appreciable amount of resorcinol.

Example 3

A dry sample (100 g.) of sodium-m-benzenedisulfonate caustic soda fusion mix is mixed with 250 ml. of chlorobenzene and then 75 g. of concentrated HCl is added and the mixture heated slowly to reflux. Over a period of ¾ hour a total of 48 ml. of water is separated out from the azeotrope by means of a trap and the mixture temperature reaches 129° C. Then another 10 g. of concentrated HCl is added and another 5 ml. of water is trapped out of the azeotrope. The top extract portion is decanted hot into a beaker and the residue is leached with two more 100 ml. portions of fresh hot chlorobenzene and similarly decanted into a beaker. The combined extract (tan to orange color) is transferred hot to a flask and cooled from 90° C. to 15° C. under any desired vacuum with stirring for about ½ hour. After approximately another ten minutes at 15° C. the crystals are filtered on a Büchner, as above, washed with 50 ml. of cold chlorobenzene and 50 ml. of petroleum ether and dried at 50–70° C. for ¼ hour. Eleven grams of tan-colored resorcinol crystals are obtained, which analyze as follows:

94.8% resorcinol (bromination); 0.12% phenol; congealing point 104.1° C.

Example 4

Another 100 g. portion of the same dry fusion mix as in Example 3 is mixed with 250 ml. of chlorobenzene and then 75 g. of concentrated HCl is added and the mix heated to reflux. Over a ¾ hour period 50 ml. of water is separated by means of a trap, as above, and the temperature reaches 129° C. The top extract portion is decanted into a beaker and the residue again extracted at the boiling point with two more 100 ml. portions of chlorobenzene. The combined tan to yellow extract is transferred to a still and the chlorobenzene removed by cooling under a low vacuum of about 150 mm. of mercury, and the resorcinol containing phenol is distilled fractionally under high vacuum of about 2 mm. of mercury. Ten grams of white crystalline resorcinol is obtained from the distillation as above which analyze as follows:

97.7% resorcinol (bromination, 1.4% phenol).

While we have described our invention above in detail we wish it to be understood that many changes may be made therein without departing from the spirit of the same.

We claim:

1. A process which comprises treating with a solvent selected from the group consisting of chlorobenzene and toluene at an elevated temperature below the boiling point of said solvent, a reaction mixture obtained from the formation of resorcinol containing resorcinol and phenol, to which an acid has been added and the water has been removed by distilling off an azeotrope, the said solvent being more effective as a solvent of phenol than of resorcinol, and then separating the resorcinol from the phenol and from said solvent simultaneously by cooling.

2. A process which comprises treating with chlorobenzene, at an elevated temperature below the boiling point of the solvent, a reaction mixture obtained from the formation of resorcinol containing resorcinol and phenol, to which an acid has been added and the water has been removed by distilling off an azeotrope, the said chlorobenzene being more effective as a solvent of phenol than of resorcinol, and then separating the resorcinol from phenol and from the solvent simultaneously by cooling.

3. A process which comprises treating with chlorobenzene, at an elevated temperature below the boiling point of the solvent, a reaction mixture obtained from the formation of resorcinol containing resorcinol and phenol, to which an acid has been added and the water has been removed by distilling off an azeotrope, the said chlorobenzene being more effective as a solvent of phenol than of resorcinol, and then separating the resorcinol from phenol and from the solvent simultaneously by cooling and precipitation of resorcinol.

4. A process which comprises treating with toluene, at an elevated temperature below the boiling point of the solvent, a reaction mixture obtained from the formation of resorcinol containing resorcinol and phenol, to which an acid has been added and the water has been removed by distilling off an azeotrope, the said toluene being more effective as a solvent of phenol than of resorcinol, and then separating the resorcinol from phenol and from the solvent simultaneously by cooling.

5. A process which comprises treating with toluene, at an elevated temperature below the boiling point of the solvent, a reaction mixture obtained from the formation of resorcinol containing resorcinol and phenol, to which an acid has been added and the water has been removed by distilling off an azeotrope, the said toluene being more effective as a solvent of phenol than of resorcinol, and then separating the resorcinol from phenol and from the solvent simultaneously by cooling and precipitation of resorcinol.

PHILIP W. OPPENHEIMER.
WILLIAM R. CAKE.

REFERENCES CITED

The following references are of record in the file of this patent:

UNITED STATES PATENTS

| Number | Name | Date |
| --- | --- | --- |
| 2,381,209 | Cotton | Aug. 7, 1945 |

FOREIGN PATENTS

| Number | Country | Date |
| --- | --- | --- |
| 415,715 | Great Britain | Aug. 28, 1934 |